United States Patent
Villasenor et al.

(10) Patent No.: US 10,547,931 B2
(45) Date of Patent: Jan. 28, 2020

(54) HEADSET WITH IMPROVED DON/DOFF DETECTION ACCURACY

(71) Applicant: Plantronics, Inc., Santa Cruz, CA (US)

(72) Inventors: Luis Villasenor, Tijuana (MX); Jose Abel Hernandez Rueda, Tijuana (MX)

(73) Assignee: Plantronics, Inc., Santa Cruz, CA (US)

( * ) Notice: Subject to any disclaimer, the term of this patent is extended or adjusted under 35 U.S.C. 154(b) by 36 days.

(21) Appl. No.: 15/687,261

(22) Filed: Aug. 25, 2017

(65) Prior Publication Data
US 2019/0069068 A1  Feb. 28, 2019

(51) Int. Cl.
*H04R 1/10*  (2006.01)

(52) U.S. Cl.
CPC ....... *H04R 1/1041* (2013.01); *H04R 2460/03* (2013.01)

(58) Field of Classification Search
CPC .............. H04R 1/1041; H04R 2460/03; H04R 2201/109; H04R 1/1008; H04R 2201/025; H04M 1/05; H04M 1/72569
USPC .............. 381/74, 58, 375, 123; 455/575.2; 379/428.02
See application file for complete search history.

(56) References Cited

U.S. PATENT DOCUMENTS

| | | | |
|---|---|---|---|
| 8,045,727 B2 | 10/2011 | Philipp | |
| 2005/0058280 A1* | 3/2005 | Ma | H04M 1/05 379/430 |
| 2008/0092149 A1* | 4/2008 | Rowbotham | G06F 9/451 719/321 |
| 2008/0232604 A1* | 9/2008 | Dufresne | A61B 5/061 381/67 |
| 2009/0041267 A1 | 2/2009 | Lee et al. | |
| 2011/0182458 A1 | 7/2011 | Rosener et al. | |
| 2012/0275615 A1 | 11/2012 | Kelly et al. | |
| 2013/0120005 A1 | 5/2013 | Magnusson et al. | |
| 2013/0202126 A1 | 8/2013 | Chen et al. | |
| 2014/0254853 A1 | 9/2014 | Blonder et al. | |
| 2014/0378083 A1 | 12/2014 | Kannappan et al. | |
| 2016/0073200 A1* | 3/2016 | Yoo | H04R 5/0335 381/311 |

FOREIGN PATENT DOCUMENTS

EP   2704451 A1   3/2014
JP   2016-127473 A   7/2016

OTHER PUBLICATIONS

International Search Report and Written Opinion of the International Searching Authority dated Oct. 23, 2018, issued in international PCT Application No. PCT/US2018/047531, 12 pages.

* cited by examiner

*Primary Examiner* — Vivian C Chin
*Assistant Examiner* — Con P Tran
(74) *Attorney, Agent, or Firm* — Haynes Beffel & Wolfeld, LLP (57) ABSTRACT

A headset is described which includes a speaker capsule and a headband connected to the speaker capsule with a first sensor on the headset for sensing an angle of rotation of the speaker capsule relative to the headband, and a second sensor on the headset for sensing a Don/Doff event. The angle of rotation sensor can indicate whether the speaker capsule on the headband is in a wearable position or in a non-wearable position. Logic controls an operation of the headset in response, such as changing power management modes, signaling host devices, and enabling/disabling the second sensor.

20 Claims, 6 Drawing Sheets

| Event No. | (A) Sensor signals a state change | | (B) Timer verification of other sensor | | Action |
|---|---|---|---|---|---|
| | Previous sensor state | New sensor state | Previous sensor state | New sensor state | |
| 1 | DOFF | DON | Flat | Flat | Ignore DON event. Headset stays in DOFF state |
| 2 | | | Flat | Non-Flat | Wake up from low-power mode. Accept DON event (signal host device) and act accordingly. Example: If incoming call, then answer call. |
| 3 | | | Non-Flat | Flat | Ignore DON event. Headset stays in DOFF state |
| 4 | | | Non-Flat | Non-Flat | Accept DON event (signal host device) and act accordingly. Example: If incoming call, then answer call. |
| 5 | DON | DOFF | Flat | Flat | Unusual condition. Set DOFF state in Headset and enter into low power mode (i.e. energy saving feature). Signal "I am away" to PC |
| 6 | | | Flat | Non-Flat | Unusual condition. Set DOFF state in Headset (signal host device) |
| 7 | | | Non-Flat | Flat | Accept DOFF event (signal host device) and enter into low power mode (i.e. energy saving feature). Signal "I am away" to PC |
| 8 | | | Non-Flat | Non-Flat | Accept DOFF event (signal host device) and act accordingly. Example: If playing music, then pause music playback |
| 9 | Flat | Non-Flat | DON | DON | Unusual initial condition. Ignore event and take no action |
| 10 | | | DON | DOFF | Unusual initial condition. Accept DOFF event (signal host device). Set DOFF state in Headset |
| 11 | | | DOFF | DON | Wake up from low-power mode. Accept DON event (signal host device) and act accordingly. Example: If incoming call, then answer call. |
| 12 | | | DOFF | DOFF | Power UP Headset. Wait for next sensor triggered event. |
| 13 | Non-Flat | Flat | DON | DON | Ignore state of DON/DOFF sensor and enter into low power mode (i.e. energy saving feature). |
| 14 | | | DON | DOFF | |
| 15 | | | DOFF | DON | |
| 16 | | | DOFF | DOFF | |

FIG. 7

HEADSET WITH IMPROVED DON/DOFF DETECTION ACCURACY

BACKGROUND

Field

The present invention relates to audio headsets, and circuitry for controlling operation of audio headsets in response to handling of the headset by the user.

Description of Related Art

Don/Doff detection for headsets, such as audio headphones, has been employed for power management and other functions. See, e.g., United States Patent Application Pub. No.: US 2011/0182458, entitled FLOATING PLATE CAPACITIVE SENSOR, by Rosener et al., published 28 Jul. 2011.

Don/Doff sensors can generate false positive signals, when the headset is placed in proximity to an electronic device, for example, which can interfere with the sensor operation. False positive signals from Don/Doff sensors can result in false state indications, leading to wasted power consumption. For example, the headset may be left in an active state for a period of time, while laying on a desk. Consequently, the battery on the headset can be discharged.

It is desirable to provide technology to reduce false state indications from Don/Doff sensors, and to generally improve the intelligence of power management modes and of logic used in response to handling of the headset, including Don/Doff movements.

SUMMARY

A headset is described, including a speaker capsule and a headband connected to the speaker capsule with a first sensor on the headset for sensing an angle of rotation of the speaker capsule relative to the headband, and a second sensor on the headset for sensing a Don/Doff event. The angle of rotation sensor can indicate whether the speaker capsule on the headband is in a wearable position or in a non-wearable position.

Logic on the headset is connected with the first and second sensors to control an operation of the headset, such as changing power management modes, signaling host devices, and enabling/disabling the second sensor.

In some embodiments, the logic responsive to the first and second sensors is responsive to a relative timing of changes of a first signal provided by the first sensor, relative to changes of a second signal provided by the second sensor.

The technology is applied in some embodiments for over-the-head headsets configured to allow rotation of the speaker capsules to a lay-flat position.

In one aspect, the technology described herein is a method for operating a headset. The method includes sensing an angle of rotation of a speaker capsule on the headset relative to a headband on the headset, indicating for example whether the speaker capsule is disposed at a wearable angle (e.g. fitting on the ear) or a non-wearable angle (e.g. lay flat). The method also includes sensing a Don/Doff event, such as can be indicated using capacitive sensors. This allows controlling and operation of the headset as a function of the sensed angle of rotation in combination with sensing of a Don/Doff state.

Therefore, an improved headset and method for operating a headset are provided which can automatically execute functions to save power or improve operations of the headset based on how the headset is handled by the user. For example, as a headset is laid flat on a table or in a carrying case, or as speaker capsules are rotated to position the headset to be placed on the user's head, or as the headset is placed on the user's head or removed from the user's head, operations of the headset can be performed as a result.

Other aspects and advantages of the present technology can be seen on review of the drawings, the detailed description and the claims, which follow.

BRIEF DESCRIPTION OF THE DRAWINGS

FIG. 7 is a table illustrating operations executed in response to sequences of Don/Doff and angle of rotation signals.

DETAILED DESCRIPTION

A detailed description of embodiments of the present invention is provided with reference to the FIGS. 1-7.

Figure 1:
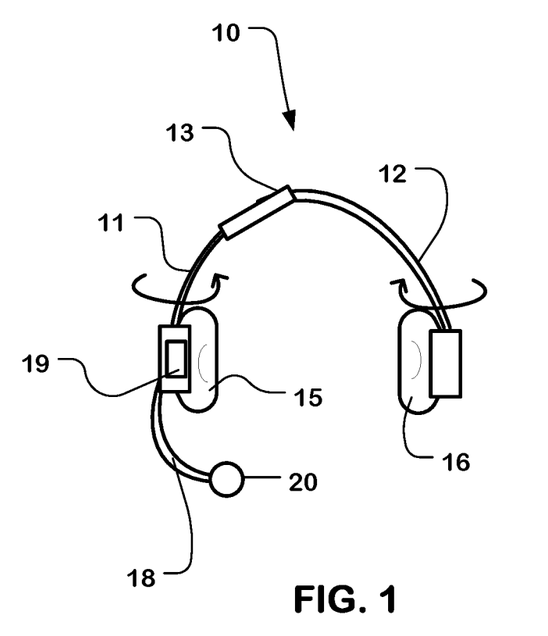
FIG. 1 is a simplified illustration of a headset including a Don/Doff sensor and a lay flat sensor as described herein.

FIG. 1 is a simplified diagram of a headset 10 of the type that is configured to communicate, either wirelessly or by a wired connection (not shown), with a host device, such as a smart phone, a personal computer, or other sources of audio streams to be played by the speakers on the headset 10. The headset 10 includes a headband which is composed in this example of a first strip 11 and a second strip 12 coupled by a guide 13 allowing adjustment of the length of the headband. The headset 10 includes ear cups 15 and 16, referred to herein more generically as speaker capsules. In some headsets, there is only one speaker capsule. In FIG. 1, a microphone boom 18 is coupled to the ear cup 15, and includes a microphone 20 at the distal tip. The microphone boom 18 may not be utilized in other embodiments.

Electronic components 19 are mounted on the headset, and include a power source such as a battery, a communication interface, a logic circuitry such as a data processor which can execute computer programs, an audio driver for the speakers on the ear cups, and other components. In this example, the electronic components 19 include a Don/Doff sensor.

The first strip 11 on the headband in this example is coupled to the ear cup 15 by, for example, a rotary union. The rotary union includes a first element on the first strip 11 that includes one of a shaft and a housing, and a second element on the ear cup 15 that includes a complementary one of the housing and the shaft. The rotary union can include bearings or a bearing surface. Also, the rotary union may include seals and a retaining mechanism such as a retaining clip. (Rotary unions can also be referred to as rotary couplings or joints and swivel joints.) The rotary union allows rotation of the first element relative to the second element around an axis of the shaft, over a range which can vary in extent according to the particular embodiment including for some examples 90°, 180°, and 360°.

The rotary union can include a slip ring, or other circuit component, for conduction of electricity between a circuit on the first element and a circuit on the second element. In this manner, the electronic components mounted on one of the ear cups can be electrically connected to the speaker on the other ear cup, or to other electronic components on the headband.

Don/Doff sensing can be used to control operations by the electronic components 19 on the headset, including one or more of audio processing and amplification functions like noise cancellation, active filtering and equalization. Also, Don/Doff sensing can be used to control operations for maintenance and establishment of communication channels with a host device for signaling functions like pause/play/resume, auto-answer an incoming call, hang up a call and other user experience enhancement operations. Also, Don/Doff sensing can be used to control operations enabling logical and/or physical layer operation of wired (e.g. USB) and wireless (e.g. Bluetooth) interface circuits, and other functions useful for power management and enhancement of user experience. In one example, when the headset senses is a Doff state, the electronic components execute an operation to enter a power saving mode, in which the power consumed by the electronics on the headset is reduced compared to an operating mode in effect at the time the signal was received. In one example, when the headset is in a Don state, electronic components execute an operation to monitor communication channels for active audio streams, to manage a communication protocol with a host device and to receive and drive audio signals in the speakers.

Technology is described herein for including a lay flat sensor, which indicates whether the speaker capsule is oriented in a wearable angle relative to the headband or a non-wearable or a lay flat angle relative to the headband. The headset may be configured to allow rotation of the ear cups so that it can be laid flat in a carrying case for example.

The lay flat sensor can be used as described herein to reduce false positive detections by the Don/Doff mechanism used in the headset. A Don/Doff sensor can comprise a capacitive sensor which detects proximity of the ear cup to a person's head.

A false positive arises when a Don/Doff condition is detected and that event is not correct. For example, when a user puts on a headset, a Don event is triggered and the headset can perform certain functions; for example it can auto-answer an incoming call. On the other hand, if the headset is not worn, but the user touches the speaker cushion, a Don event may trigger, thus resulting a false positive event.

In FIG. 1, the ear cups 15, 16 on the headset 10 are rotated to a wearable position, in which they are configured to fit comfortably on the user's head.

Figure 2:
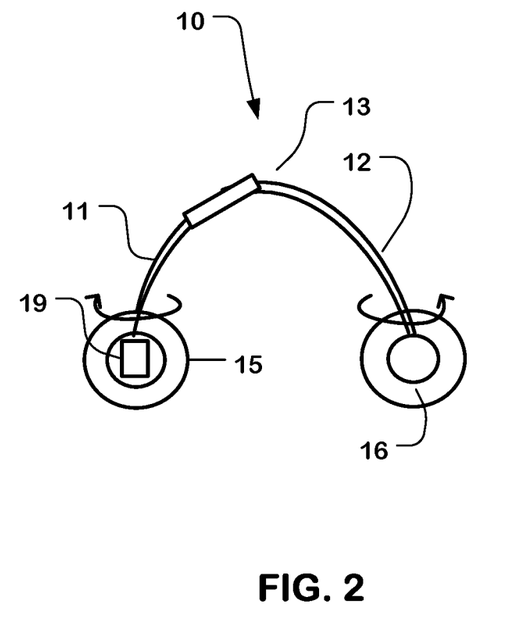
FIG. 2 is a simplified illustration of a headset like that of FIG. 1, in which the ear cups are rotated to a lay flat position.

FIG. 2 illustrates the headset 10 of FIG. 1 (without the microphone boom) in which the ear cups 15, 16 have been rotated to a lay flat position.

Figure 3A:
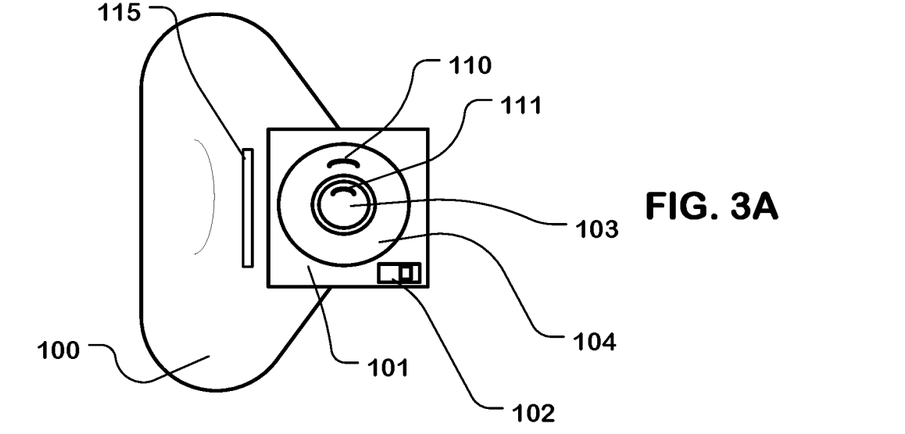
FIGS. 3A-3C are simplified diagrams of an ear cup with an angle of rotation sensor for indicating wearable and non-wearable angles.
Figure 3B:
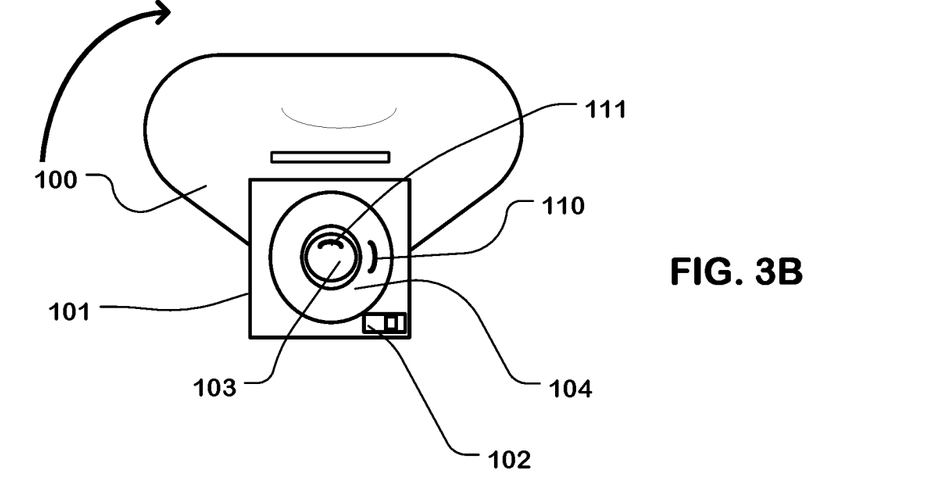
Figure 3C:
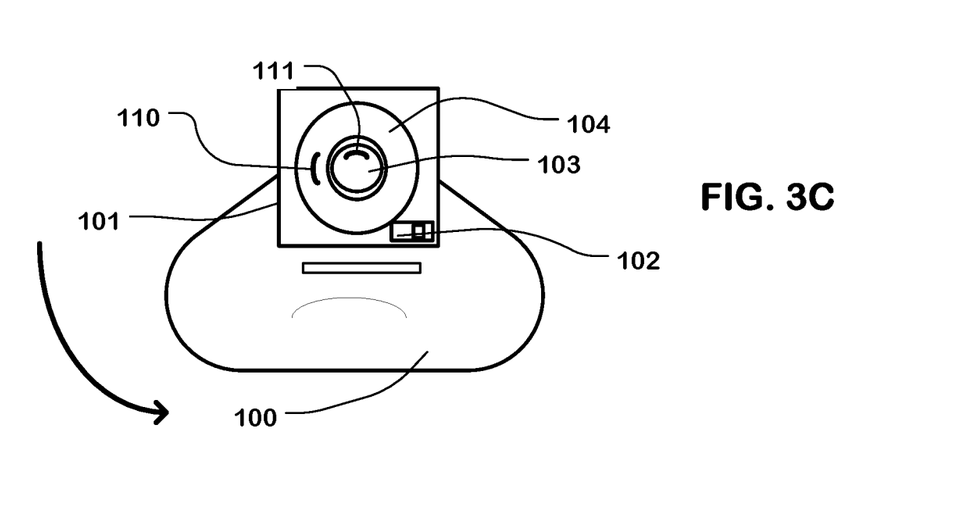

FIGS. 3A-3C illustrate an angle of rotation sensor with the ear cup in three different angular positions. In this embodiment, the ear cup 100 includes an electronics base 101 housing electronics and a battery, for example. The electronics base 101 includes an on-off switch 102. A capacitive proximity sensor plate, schematically element 115 in the figure, is disposed on the ear cup 100. A rotary union connecting the headband to the ear cup is illustrated in cross-section, showing a shaft 103, which can be on the electronics base 101, or on the headband, and showing a housing 104 which can be on the complementary one of the base 101 or headband.

The angular sensor in this embodiment includes sensor pad 111 and a ground pad 110. The sensor pad 111 is connected with a cable (not shown in figure) to the circuitry on the base 101. The ground pad 110 can be a small metal foil, or other conductive plate, that is connected to ground (GND) or another reference voltage in the circuitry on the base 101 via a slip ring on the rotary union, or otherwise. The relative positions of the sensor pad 111 and the ground pad 110 can be sensed based on variations in capacitance that can be sensed as their relative positions change. The same components shown in FIGS. 3A-3C are given like reference numbers and not described again.

In FIG. 3A, the sensor pad 111 and the ground pad 110 are aligned (vertically in the perspective of the figure). When the speaker capsule is in normal wearing position, then the ground plane foil and the sensor pad are aligned and the sensor capacitive measurement is high. Alignment of the pads 111, 110 indicates that the speaker capsule is in an angular position relative to the headband, which is a wearable angle.

FIG. 3B, shows the speaker capsule in non-wearable, flat position (i.e. rotated positive 90 degrees relative to the position of FIG. 3A). As can be seen, ground pad 110 and sensor pad 111 are not aligned and the sensor capacitive measurement is low. When the speaker capsule is not in a normal wearing position, then the ground plane foil and the sensor pad are not aligned and the sensor capacitive measurement is lower. In this way, it is possible to detect if the speaker capsule is in the flat position, or not.

FIG. 3C shows the speaker capsule in non-wearable, flat position (i.e. rotated negative 90 degrees relative to the position of FIG. 3A). As can be seen, ground pad 110 and the sensor pad 111 are not aligned and the sensor capacitive measurement is lower.

When the ear cup is at the neutral position, as in FIG. 3A, the sensor pad and the GND reference plane are aligned and the capacitive sensor detects a high parasitic capacitance. On the contrary, if the ear cup is not at the neutral position, as in FIG. 3B or 3C, the sensor pad and the GND reference plane are not aligned and the capacitive sensor detects a lower capacitance. So, based on the level of the sensed capacitance it is possible to determine if the ear cup is at the neutral wearable position or not. When the ear cup is at the neutral position, the Don/Doff function can be enabled and it will be possible to detect Don and Doff events. On the other hand, when the ear cup is not at the neutral position the Don/Doff function can be disabled and the detection of Don and Doff events is not enabled. It should be noted that the proposed mechanism can be implemented in one or both ear cups.

In the embodiment shown in FIGS. 3A-3C, the ground pad 110 is on the housing element of the rotary union and the sensor pad 111 is on the shaft element. In other embodiments, the locations of the ground pad 110 and the sensor pad 111 are reversed.

In other embodiments, different types of angle of rotation sensors might be utilized. Also, in the illustrated example, the sensor is capable of indicating a wearable position (e.g. FIG. 3A) and non-wearable positions (e.g. FIGS. 3B, 3C). In other embodiments, the sensor can be utilized to indicate more precisely specific angle positions to be used for control of operations of the headset. For example, the sensor can be utilized to detect when the speaker capsule has been rotated to a position in a more narrow range (for example 85° to 95°) relative to the wearable position at 0°. This more narrow range can indicate whether the headset is actually in a lay flat position, or in a non-wearable position that is not fully flat.

Figure 4:
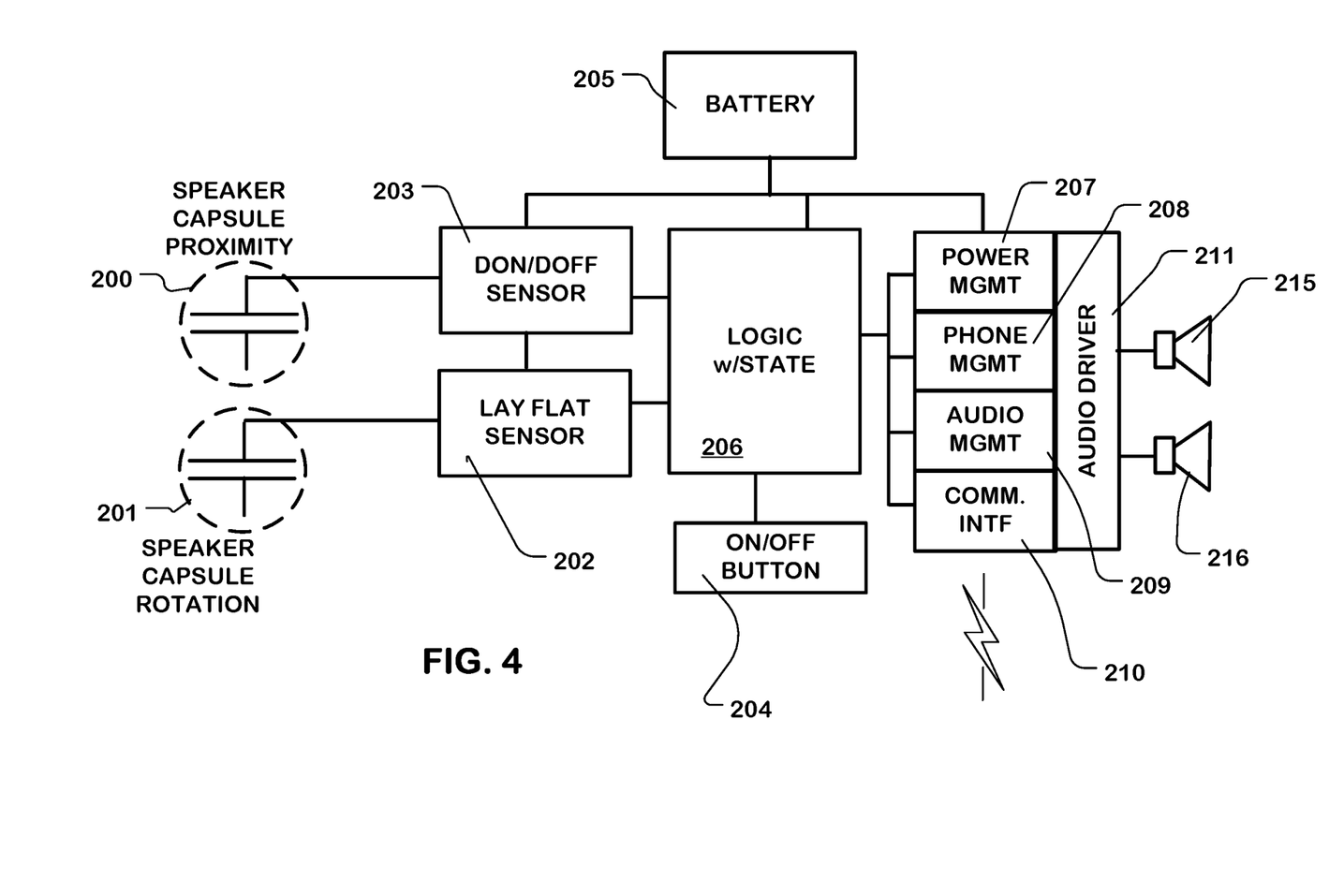
FIG. 4 is a simplified diagram of electronic components of a headset including a Don/Doff sensor and an angle of rotation sensor as described herein.

FIG. 4 is a simplified diagram of electronic circuitry on the headset including a Don/Doff sensor circuit 203 including a capacitive speaker capsule proximity sensor 200, and a "lay flat" sensor circuit 202 including a capacitive speaker capsule angle of rotation sensor 201. The Don/Doff sensor circuit 203 can generate electrical signals to activate the capacitive sensor, and sense capacitance. In response to the sensed capacitance, a signal is generated, for example, if the capacitance meets a threshold condition indicating that the speaker capsule is close to a conductive surface such as a person's ear. The lay flat sensor circuit 202 can generate electrical signals to activate the capacitive speaker capsule rotation sensor 201, and sense capacitance. In response to the sensed capacitance, a signal is generated as discussed above in connection with FIGS. 3A-3C.

Circuitry on the headset includes an on/off button 204 (or switch) and a battery 205.

The electronic circuitry on the headset includes a speaker on each ear capsule, including speakers 215 and 216, in this example. An audio driver 211 is coupled to the speakers and controlled by functional logic and circuits on the device. In the illustrated example, functional logic and circuits on the headset include power management logic 207, telephone management logic 208, audio management logic 209, and a communication interface 210.

Logic circuitry 206 which can maintain a state that indicates a sequence of transitions in the first and second signals, is coupled to the Don/Doff sensor circuit 203 and the lay flat sensor circuit 202, and generates control signals in response to the signal (a "first signal") generated by the lay flat sensor circuit 202, and the signal (a "second signal") generated by the Don/Doff sensor circuit 203. The control signals are based on interpretation of the first and second signals, and are applied to the functional logic and circuits 207-211, and in some embodiments to control enabling and disabling of the Don/Doff sensor circuit 203. See FIG. 7 for one example of headset operations controlled in response to the Don/Doff sensor 203 and the lay flat sensor circuit 202.

The power management logic 207 is used to apply variant power conditions to components of the headset depending on an operating mode. The power management logic 207 can change from an active operating mode to a power saving mode, in which the power applied to one or more of the components of the headset is reduced compared to the power applied during the previous active operating mode, or compared to the power applied during a subsequent operating mode. One example power saving mode might place the headset in an idle mode in which power to the audio driver 211 is off, while power to the communication interface 210 remains on with a low communication speed for example. A variety of power saving modes might be implemented depending on the state of the headset when the power saving mode event occurs.

The phone management logic 208 can manage a communication protocol with a host device that includes a telephone. The communication protocol can include exchanging messages to cause auto answer of a telephone call, to cause hanging up of a telephone call, and to cause other functions related to handling of telephone calls.

The audio management logic 209 can manage a communication protocol with a host device that includes a source of audio streaming data, which can be played using the speakers on the headset. The communication protocol of the audio management logic can include exchanges of messages to cause a pause of an audio stream, a resume of an audio stream, and other functions related to handling of audio streams.

The communication interface 210 can include wired or wireless communication ports adapted for communication with a host device. The communication interface can have more than one operating mode, depending on the characteristics of the host device, the power management mode of the device, and other characteristics.

The sensor logic 206, and the other circuitry modules 207-211, can be implemented using analog and digital circuitry. In some examples, logic is implemented using a processor executing computer instructions. In some examples, the logic is implemented using dedicated state machines and other logic circuitry. In some examples, the logic is implemented using a combination of a processor with dedicated circuitry.

Figure 5:
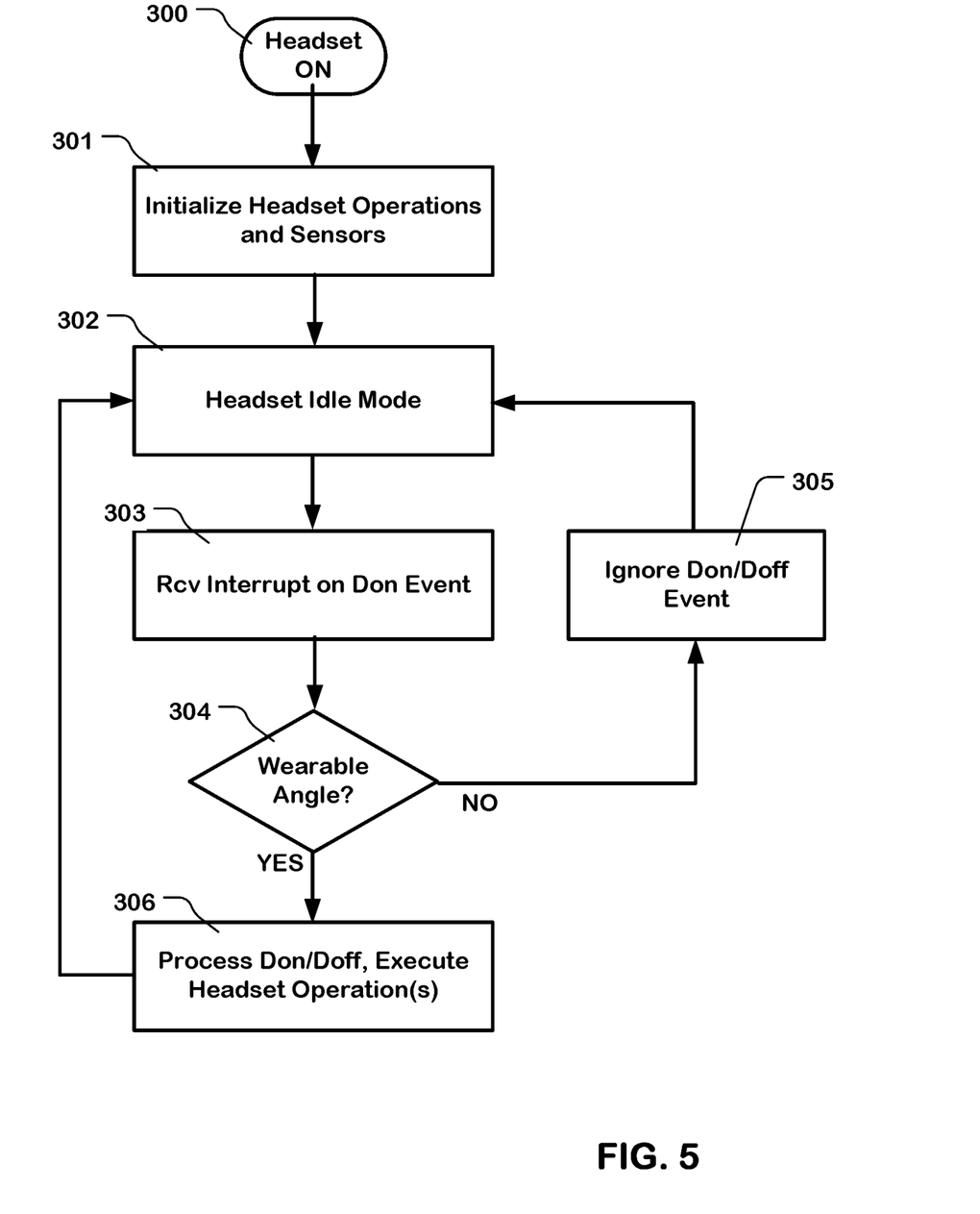
FIG. 5 is a simplified flowchart of logic responsive to a Don/Doff sensor and an angle of rotation sensor as described herein.

FIG. 5 is a simplified flowchart of a method for operating a headset as described herein. In the method of FIG. 5, a headset ON event 300 begins the operation when an on/off switch is toggled. Upon receiving the headset ON event, logic on the headset initializes the headset operations and sensors (301). After initialization, the headset enters an idle mode (302) in which relatively low power is consumed with minimal control circuitry energized. When, during the idle mode, an interrupt is received indicating a Don event (303), the method determines whether the lay flat sensor indicates that the speaker capsule is disposed at a wearable angle (304). If the speaker capsule is not at a wearable angle, then the Don event is ignored (305), and the logic returns to the idle mode at block 302. If at block 304, the speaker capsule is at a wearable angle, then the Don event is processed enabling execution of headset operations (306). Although not shown, if an interrupt is received indicating a Doff event while the headset is performing headset operations, then the circuitry can cause an action appropriate to the interrupted operation (e.g., pause audio stream, hang up phone, etc.), and return to the headset idle mode 302.

Figure 6:
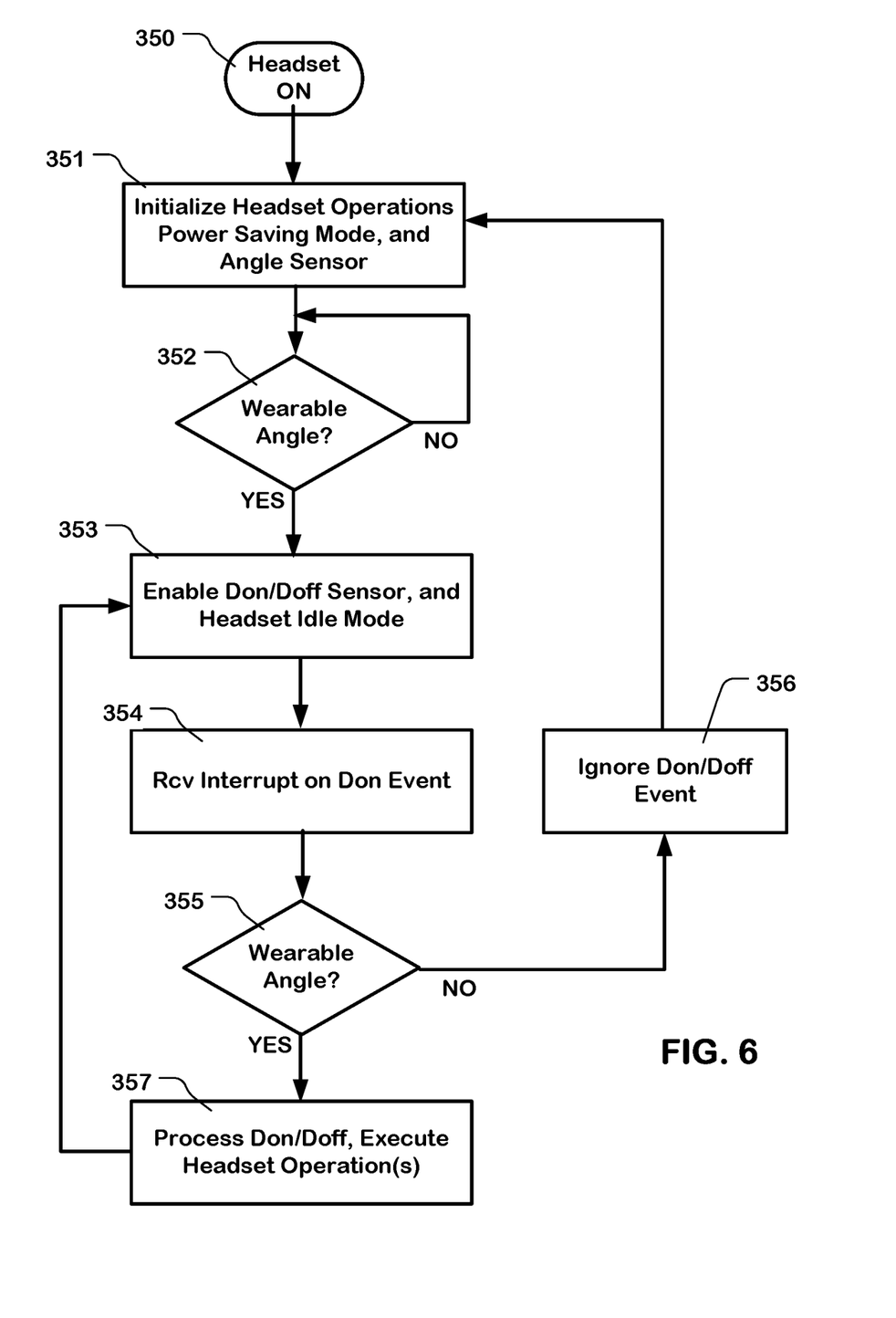
FIG. 6 is a simplified flowchart of logic used to enable a Don/Doff sensor in response to an angle of rotation sensor.

FIG. 6 is a simplified flowchart of an alternative method for operating a headset as described herein. In the method of FIG. 6, a headset ON event 350 begins the operation for example when the on/off switch is toggled. Upon receiving the headset ON event, logic on the headset initializes the headset operations and sets a low power (power saving) mode, and initializes the lay flat angle sensor (351). Circuitry monitors the lay flat angle sensor to determine whether the ear capsule is, or ear capsules are, disposed in a wearable angle (352). If not, then the circuitry continues to monitor the sensor. If the ear capsule is, or ear capsules are, disposed in a wearable angle at block 352, then the circuitry enables the Don/Doff sensor and maintains the headset in an idle mode (353). The idle mode can be the same as the power saving mode of block 351 in some embodiments, with the exception that the Don/Doff sensor is enabled during the idle mode. In the idle mode, the headset receives an interrupt indicating a Don event (354). Upon receipt of the Don event, the circuitry can determine whether the ear capsules remain in a wearable angle (355). If the ear capsules do not remain in a wearable angle, then the Don/Doff event is ignored (356), and the circuitry returns to the power saving mode with the angle sensor enabled and the Don/Doff sensor disabled (351). If at block 355, the ear capsules are disposed in a wearable angle, then the Don/Doff event is processed, and one or more head set operations is/are executed (357).

FIG. 7 defines operation of the logic 206 which can be combined in an example embodiment of a headset implemented as described with reference to FIG. 4. The first column of the table includes an event number for 16 different events interpreted by logic according to this table when the headset is an ON state. In the second column of the table, four possible sensor transition states are shown, with sub columns showing a previous sensor state and a new sensor state. The four possible sensor transition states in the second column of the table include transitions of the signal from the Don/Doff sensor: Doff to Don, Don to Doff; and transitions of the signal from the lay flat sensor: flat to non-flat, non-flat to flat.

The third column of the table includes first and second sub columns with 16 entries, listing four possible second sensor transition states for each of the four possible sensor transition states in the second column. The four sensor transition states in the third column for events in the second column involving transitions in the lay flat sensor output include transitions of the signal from the Don/Doff sensor: Doff to Don, Don to Doff, Doff to Doff, and Don to Don. The four sensor transition states in the third column for events in the second column involving transitions in the Don/Doff sensor include transitions of the signal from the lay flat sensor: flat to non-flat, non-flat to flat, non-flat to non-flat, and flat to flat.

The fourth column of the table describes an action or actions. The action of the logic circuit 206 can include generating control signals and sending them to the appropriate functional modules on the headset, to cause the operations such as those listed in this fourth column of the table.

The table includes examples in which the logic is responsive to relative timing of changes in the first signal to changes in the second signal.

The table includes examples in which the operation performed in response to the first and second signals includes control of changing power management modes.

The table includes examples in which the headset includes logic to communicate with an audio source, and the operation performed in response to the first and second signals includes sending one or more of pause and resume messages to the audio source.

The table includes examples in which the headset includes logic to communicate with a telephone, and the operation performed in response to the first and second signals includes sending one or more of hold, hang-up and answer messages to the telephone.

The table includes examples in which upon a change in the second signal from a Don state to a Doff state, followed within a preset time interval by a change in the first signal from a wearable angle to a non-wearable angle, the operation includes changing a power management mode on the headset.

The table includes examples in which upon a change in the second signal from a Don state to a Doff state, followed within a preset time interval by a change in the first signal from a wearable angle to a non-wearable angle, the operation includes turning off power on the headset.

The table includes examples in which if the first signal indicates a non-wearable angle, the operation includes disabling the Don/Doff sensor.

The table includes examples in which upon a change in the first signal from a non-wearable angle to a wearable angle, followed within a preset time interval by a change in the second signal from a Doff state to a Don state, the operation includes changing a power management mode on the headset, and sending a message indicating the Don state via the a communication interface to a host device.

The table includes examples in which upon a change in the first signal from a non-wearable angle to a wearable angle, not followed within a preset time interval by a change in the second signal from a Doff state to a Don state, the operation includes changing a power management mode on the headset.

Portions of methods described herein can be implemented using computer programs stored on a computer-readable memory, including a non-transitory storage medium or media, storing instructions executable by a processor to perform any of the methods described above. Yet another implementation of the method described in this section can include a system including memory and one or more processors operable to execute instructions, stored in the memory, to perform any of the methods described above.

A number of flowcharts illustrating logic are described herein. The logic can be implemented using processors programmed using computer programs stored in memory accessible to the computer systems and executable by the processors, by dedicated logic hardware, including field programmable integrated circuits, and by combinations of dedicated logic hardware and computer programs.

With all flowcharts herein, it will be appreciated that many of the steps can be combined, performed in parallel, or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

The technology described herein can be applied for an over-the-head, fold-flat headset that makes use of capacitive sensor features. The technology makes it possible to detect the alignment between the ear cup and the headband by measuring the capacitance in a capacitive sensor pad. The alignment detection can be applied by logic to reduce false detection of events during certain corner use cases, thus enhancing the Don/Doff detection accuracy.

The technology described herein can be applied as a mechanism to enable/disable the Don/Doff function in fold-flat headsets.

The technology described herein can be applied to improve Don/Doff detection reliability.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An apparatus, comprising:
a headset including a speaker capsule and a headband connected to the speaker capsule;
a first sensor on the headset which generates a first signal indicating whether an angle of rotation of the speaker capsule relative to the headband is a wearable angle or a non-wearable angle;
a second sensor on the headset which generates a second signal indicating a Don state and a Doff state; and logic on the headset connected with the first and second sensors to control an operation of the headset as a function of the first signal and the second signal.

2. The apparatus of claim 1, wherein the logic is responsive to relative timing of changes in the first signal to changes in the second signal.

3. The apparatus of claim 1, wherein the headset includes a power management circuit that applies variant power levels in different power management modes to components of the headset, and the operation includes changing power management modes.

4. The apparatus of claim 1, wherein the headset includes logic to communicate with an audio source, and the operation includes sending one or more of pause and resume messages to the audio source.

5. The apparatus of claim 1, wherein the headset includes logic to communicate with a telephone, and the operation includes sending one or more of hold, hang-up and answer messages to the telephone.

6. The apparatus of claim 1, wherein upon a change in the second signal from a Don state to a Doff state, followed within a preset time interval by a change in the first signal from a wearable angle to a non-wearable angle, the operation includes changing a power management mode on the headset.

7. The apparatus of claim 1, wherein upon a change in the second signal from a Don state to a Doff state, followed within a preset time interval by a change in the first signal from a wearable angle to a non-wearable angle, the operation includes turning off power on the headset.

8. The apparatus of claim 1, wherein if the first signal indicates a non-wearable angle, the operation includes disabling the second sensor.

9. The apparatus of claim 1, wherein upon a change in the first signal from a non-wearable angle to a wearable angle, followed within a preset time interval by a change in the second signal from a Doff state to a Don state, the operation includes changing a power management mode on the headset, and sending a message indicating the Don state via a communication interface to a host device.

10. The apparatus of claim 1, wherein upon a change in the first signal from a non-wearable angle to a wearable angle, not followed within a preset time interval by a change in the second signal from a Doff state to a Don state, the operation includes changing a power management mode on the headset.

11. A method for operating a headset including a speaker capsule and a headband connected to the speaker capsule, comprising:
sensing whether an angle of rotation of the speaker capsule relative to the headband is a wearable angle or a non-wearable angle;
sensing whether the headset is in a Don state and a Doff state; and
controlling an operation of the headset as a function of the sensed angle of rotation and the sensed Don/Doff state.

12. The method of claim 11, wherein the controlling is responsive to relative timing of sensed changes in the angle of rotation to changes in the Don state and Doff state.

13. The method of claim 11, wherein the operation includes changing power management modes.

14. The method of claim 11, wherein the operation includes sending one or more of pause and resume messages to an audio source.

15. The method of claim 11, wherein the operation includes sending one or more of hold, hang-up and answer messages to a telephone.

16. The method of claim 11, wherein upon a sensing a change from a Don state to a Doff state, followed within a preset time interval by a change from a wearable angle to a non-wearable angle, the operation includes changing a power management mode on the headset.

17. The method of claim 11, wherein upon sensing a change from a Don state to a Doff state, followed within a preset time interval by a change from a wearable angle to a non-wearable angle, the operation includes turning off power on the headset.

18. The method of claim 11, wherein upon sensing a non-wearable angle, the operation includes disabling a Don/Doff sensor used for sensing the Don and Doff state.

19. The method of claim 11, wherein upon a change from a non-wearable angle to a wearable angle, followed within a preset time interval by a change from a Doff state to a Don state, the operation includes changing a power management mode on the headset, and sending a message indicating the Don state via a communication interface to a host device.

20. The method of claim 11, wherein upon a change from a non-wearable angle to a wearable angle, not followed within a preset time interval by a change from a Doff state to a Don state, the operation includes changing a power management mode on the headset.

* * * * *